Jan. 21, 1969
G. L. BACHNER
3,423,495
BLOW MOLDING METHOD AND APPARATUS
Filed April 30, 1965
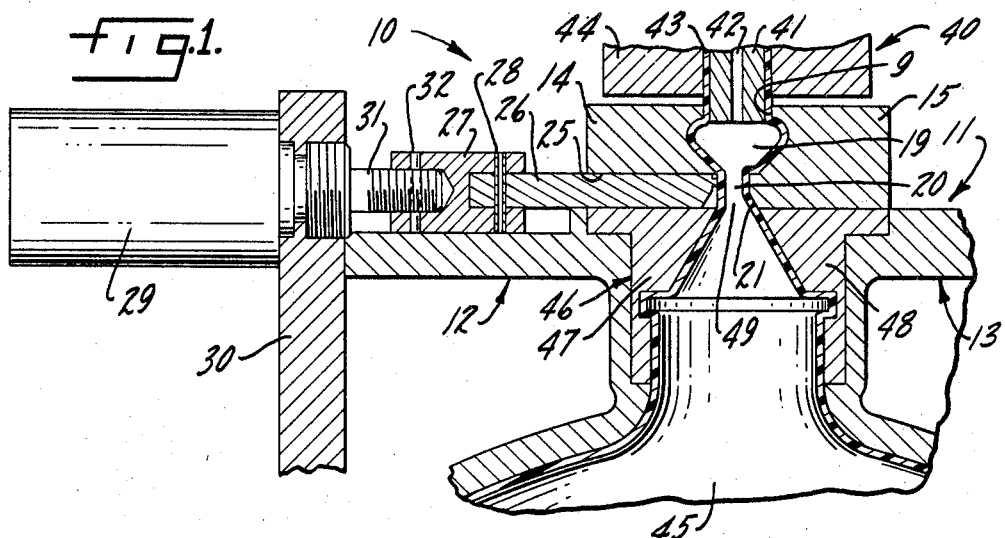
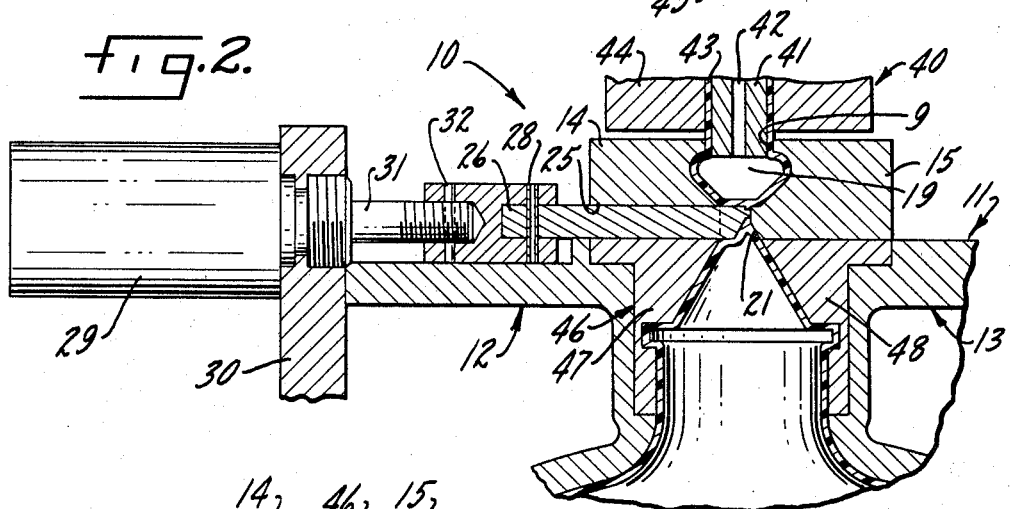
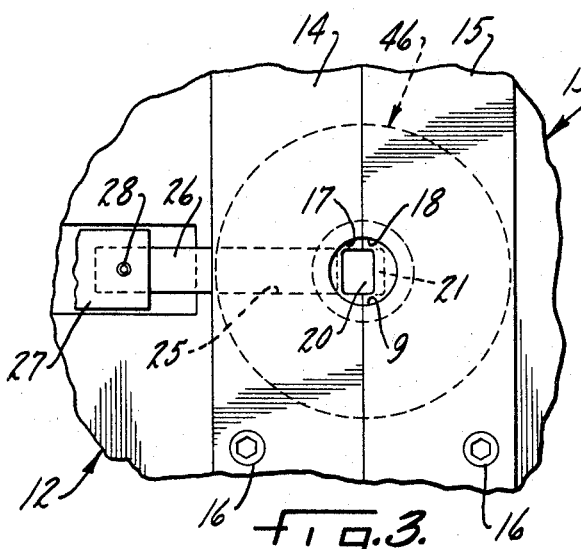
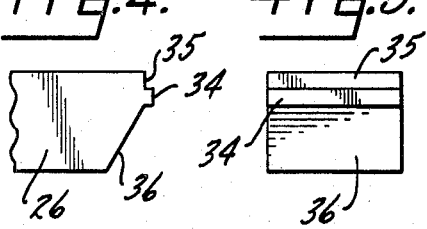
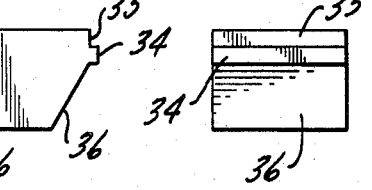
INVENTOR.
George L. Bachner,
BY Parker & Carter
Attorneys.

United States Patent Office 3,423,495
Patented Jan. 21, 1969

3,423,495
BLOW MOLDING METHOD AND APPARATUS
George L. Bachner, Chicago, Ill., assignor to Carroll Street Corporation, Chicago, Ill., a corporation of Delaware
Filed Apr. 30, 1965, Ser. No. 452,257
U.S. Cl. 264—96   5 Claims
Int. Cl. B29d 23/03; B65b 55/04

This invention relates to the blow molding art, and particularly to an apparatus and method for forming hygienic containers.

The blow molding technique is admirably suited for many sizes and shapes of containers. It is, for example, well suited for the formation of containers intended for the storage and shipment of milk and containers of half gallon capacity have been made. Such containers can be manufactured at a cost which enables the consumer to use them once and then discard them, thereby eliminating the handling and reconditioning associated with glass containers.

The use of plastic containers for milk containers has not, however, become widespread. The maintenance of the containers in a sterilized, hygienic condition up to the filling operation has been a deterrent. If the interior of the containers is exposed to air, oxygen or other deleterious gases, foreign, contaminating substances can be formed which remain in the bottle with the milk. Should the container, after filling, be subjected to environmental conditions which promote the growth of the deleterious substances, such as exposure to summer temperatures in a milk box prior to placement of the container under refrigerated conditions by a householder, the milk can be deleteriously affected.

Various attempts have been made to counteract this problem but none have been successful on a large commercial scale, primarily because of high cost. For example, containers have been formed and then immediately placed in sealed, plastic bags. The bagged containers are then shipped to a bottling plant and removed from the bag prior to passage through the filling and bottling machine. This procedure involves the extra steps of collection and placement of the containers into a bag and the release of the containers from the bag prior to filling. Furthermore, this system is not always effective because the containers may be exposed to air for a sufficiently long period of time between release from the sealed bags and passage through a filling machine to contaminate the interiors with a deleterious atmosphere. Indeed, at the present time, it appears that plastic containers have not been used to any significant extent in any milk market, particularly the home distribution market.

Accordingly, a primary object of this invention is to provide a method and apparatus for producing hygienic containers which avoid the disadvantages noted above.

Another object is to provide a method and apparatus for forming hygienic containers by the blow molding technique in which the fluid which forms the casting is sealed in the casting to thereby provide a hygienic atmosphere therein.

Yet another object is to provide a method and apparatus for forming hygienic containers by the blow molding technique in which sealing closure of the cast container is effected by self adhesion of the container material before a deleterious atmosphere is formed within the container.

Yet a further object is to provide a method of hygienically bottling materials which are subject to spoilage upon contact with deleterious gases such as oxygen under appropriate environmental conditions.

Yet another object is to provide a method as above described which is particularly well adapted to production line techniques both in respect to the formation of the containers and their use in a filling or bottling operation.

Other objects and advantages of the invention will become apparent upon reading the following description of the invention.

The invention is illustrated more or less diagrammatically in the accompanying figures, wherein:

FIGURE 1 is a sectional view through a mold assembly of the present invention showing the parts just after completion of the blowing operation with the pinch bar in retracted position;

FIGURE 2 is a view similar to FIGURE 1, illustrating a subsequent step in the method in which the pinch bar is in an extended position;

FIGURE 3 is a top plan view, with parts omitted for clarity;

FIGURE 4 is a partial side view of the tip of the pinch bar to an enlarged scale; and FIGURE 5 is an end view of FIGURE 4.

Like reference numerals will refer to like or similar parts throughout the following description of the invention.

A blow molding assembly is indicated generally at 10 in FIGURES 1 and 2. The assembly includes a die assembly 11 which consists, in this instance, of die halves 12 and 13. It will be understood that the type and configuration of the die assembly is well within the knowledge of those skilled in the art and its details are not illustrated since it does not, by itself, form an integral part of the invention.

Each die half carries a blow close bar, indicated at 14 and 15 respectively. Each blow close bar is bolted or secured by other suitable means 16 to the top of its associated die half. The blow close bars are cut away as at 17 and 18 to form a circular entry 9 which opens into a chamber 19 formed within the blow close bars when they are in abutting engagement. The chamber exit 20 is generally rectangular in configuration, as shown best in FIGURE 3. The lower portion of the surface forming the exit passage in blow close bar 15 is flared or tapered outwardly as at 21 for a purpose which will appear hereinafter.

A generally rectangular passage 25 is formed in blow close bar 14. As best seen in FIGURE 3 the passage is aligned with the chamber exit 20, and is of the same width. A pinch bar is indicated at 26. The outer end of the pinch bar is secured to a rod clevis 27 by any suitable means, such as pin 28. An air cylinder is indicated at 29, the air cylinder being fastened to wall 30 of the die half 12. Piston rod 31, which extends outwardly from the cylinder 29, is screw threaded or otherwise suitably secured to clevis 27 as indicated at 32.

The right end of pinch bar 26 is illustrated best in FIGURES 4 and 5. A pinch or cutting member is indicated at 34, the cutting or pinch member projecting forwardly of vertical surface 35. That portion of the right end of pinch bar 16 below pinch member 34 is cut away at approximately a 30° angle as indicated at 36. Both surfaces 21 and 36 may be formed at substantially the same angle for purposes of convenience.

An extrusion nozzle is indicated generally at 40. The nozzle, the construction of which may vary widely within the scope of the invention, consists of a center portion 41 which has a blow passage 42 formed centrally therein. An annular extruding passage is indicated at 43 and the external wall at 44. It will be noted that when the extruder is in the position of FIGURE 1 the clearance between the edge of inlet aperture 9 and center portion 41 is sufficient to insure that a seal will be formed about center piece 41 when the blow close bars 14 and 15 are in engagement as will be explained in detail hereinafter.

It will be understood that the die halves 12 and 13, when in engagement, form a conventional mold cavity 45. An insert is indicated at 46, the insert consisting of left and right halves 47 and 48 carried by die members 12 and 13 respectively.

The use and operation of the invention are as follows:

The invention may be best visualized in terms of a description of a complete cycle. For convenience of description, the cycle will be described as employed in the manufacture of a container for comestibles, for example a half gallon size milk container. It will be understood, however, that the invention is applicable to a wide range of sizes and types of containers.

At the commencement of the operation, dies 12 and 13 are retracted a distance sufficient to enable a parison be extruded without hindrance from extruder 40. As is conventional in the art, the parison is extruded a distance somewhat greater than the depth of the mold cavity.

After extrusion of the parison the dies 12 and 13 are brought into engagement. When the dies are in the FIGURE 1 position the lower end of the parison has been sealed by the surfaces which form the bottom end of the die cavity in a conventional manner. At the same time a seal has been formed at the nozzle-mold junction because the clearance between inlet aperture 9 and the exterior surface of the center piece 41 is of an equal or lesser thickness than the thickness of the parison. The only opening into the parison, therefore, is through aperture 42.

After the die halves 12 and 13 are in the position of FIGURE 1 and the upper and lower seals have been formed the parison is then blown to form the desired object. A charge or blast of gaseous fluid under conventional pressure is admitted through blow passage 42, the pressure of the fluid forcing the parison outwardly into engagement with the surface of the die cavity. The die halves 12 and 13 may be cooled by any suitable means so that after a predetermined dwell period of a few seconds the casting sets up.

Preferably the pressure is maintained on the fluid during most if not all of the dwell period in order to make certain the parison material will remain in contact with the mold cavity during set up. The pressure is of course released prior to actuation of the pinch bar.

Air cylinder 29 is then actuated by any suitable circuitry, the details of which lie within the knowledge of those skilled in the art, to move pinch bar 26 from its retracted FIGURE 1 position into its extended FIGURE 2 position. The cutter 34 may or may not sever the parison depending on the length of stroke of pinch bar 26 which in turn is dependent on the power of air cylinder 29. If the pinch bar stops short of making contact with die member 15 a complete severing may not occur. In either event the parison material crowded into the area indicated at 49 is self adhered to seal the interior of the casting. It will be understood that at this time in the cycle that portion of the parison material within the outlet aperture formed in blow close bars 14 and 15 is still sufficiently tacky to be self adhering.

The pinch bar may remain in its extended position for any suitable period of time, the length of which will be at once apparent to those skilled in the blow molding art. The pinch bar 26 is then retracted, the die halves 12 and 13 opened, and the sealed casting ejected.

A succeeding parison is then extruded and the cycle repeated. As will be well understood by those skilled in the art, formation of the next succeeding parison can be triggered by the opening of the die halves or the actuation of the ejection mechanism for releasing the blown parison.

Any suitable fluid may be employed to blow the parison, although air or nitrogen are preferred. Of these two materials air is usually employed because of its ready availability. Air, however, must be carefully treated prior to use in the process because the purpose of sealing the casting would be defeated if deleterious substances were trapped in the casting. Preferably the air is filtered, then heated to a point at which deleterious organic substances are killed, then cooled prior to injection under pressure. Cooling of the air reduces the setting time of the casting. If nitrogen is employed it may be feasible, depending upon its purity, to omit the sterilization step.

The resultant casting has trapped therein a nondeleterious fluid which maintains the interior of the container in a sterile condition so long as the seal is unbroken. The sealed container may then be stored without any further protective measures and shipped after any convenient lapse of time to a processing point at which the seal is broken and the container filled. The portion of the casting located above surface 50 may be discarded by a cutting or reaming operation just prior to filling with the desired contents.

Although a preferred embodiment of the invention has been illustrated and described, it will at once be apparent to those skilled in the art that modification may be made without departing from the spirit and scope of the invention. Accordingly it is intended that the scope of the invention be not limited by the scope of the foregoing exemplary description but solely by the scope of the hereinafter appended claims.

What is claimed is:

1. A method of making containers having a sterile inner surface and containing a sterile fluid, said method including the steps of:
    forming a parison having a closed hermetically sealed end and an open end,
    said open end being in continuous exclusive communication with a sterile fluid supply,
    inserting said parison within a mold cavity,
    injecting a pressurized, sterile fluid into said parison thereby expanding said parison in said cavity to the shape of the desired container, and
    hermetically sealing the open end of said container.

2. An apparatus for forming a container having a sterile inner surface and containing a sterile fluid, said apparatus including, in combination:
    a first mold part and a second mold part adapted to close in registry to form a cavity having the desired container configuration,
    means for forming a parison having a sealed end, an open end and a hollow chamber,
    a sterile fluid supply in continuous exclusive communication with said parison chamber,
    said parison forming means positioned above said mold parts and adapted to position said parison between said mold parts when such parts are separated,
    means for pressurizing said fluid supply after said parison has been positioned within said mold cavity, thereby expanding said parison to form the desired container, and
    means for closing said parison open end, thereby hermetically sealing said container.

3. The structure of claim 2 further characterized in that said closing means comprise a pair of pinch bars and means for moving at least one such pinch bar toward the other to thereby press opposing positions of the parison into abutting, self adhering contact.

4. The structure of claim 3 further characterized in that said pinch bars are adapted to form the sealed end of the next succeeding parison.

5. The structure of claim 4 further characterized in that said pinch bars are adapted to sever the hermetically sealed container from the next succeeding parison.

References Cited

UNITED STATES PATENTS 2,541,249  2/1951  Hobson _____ 264—98 X
2,991,500  7/1961  Hagen _____ 264—98 X ROBERT F. WHITE, *Primary Examiner.*

A. R. NOE, *Assistant Examiner.*

U.S. Cl. X.R.

18—5